(12) United States Patent  
Li

(10) Patent No.: US 12,112,672 B2  
(45) Date of Patent: Oct. 8, 2024

(54) DRIVE CIRCUIT AND DISPLAY DEVICE

(71) Applicant: TCL CHINA STAR OPTOELECTRONICS TECHNOLOGY CO., LTD., Guangdong (CN)

(72) Inventor: Haoran Li, Shenzhen (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/608,141

(22) PCT Filed: Aug. 24, 2021

(86) PCT No.: PCT/CN2021/114214  
§ 371 (c)(1),  
(2) Date: Nov. 1, 2021

(87) PCT Pub. No.: WO2023/019608  
PCT Pub. Date: Feb. 23, 2023

(65) Prior Publication Data  
US 2024/0021124 A1  Jan. 18, 2024

(30) Foreign Application Priority Data  
Aug. 16, 2021  (CN) .......................... 202110935822.9

(51) Int. Cl.  
G09G 3/20  (2006.01)  
(52) U.S. Cl.  
CPC ....... *G09G 3/20* (2013.01); *G09G 2300/0819* (2013.01); *G09G 2300/0842* (2013.01); *G09G 2310/08* (2013.01); *G09G 2330/021* (2013.01)

(58) Field of Classification Search  
CPC ......... G09G 3/3677; G09G 2320/0233; G09G 2310/0289; G09G 2300/0417; G09G 2310/06; G09G 2330/02; G09G 3/2092  
See application file for complete search history.

(56) References Cited

U.S. PATENT DOCUMENTS

2004/0004465 A1   1/2004  McGinnis  
2005/0110712 A1*  5/2005  Kim ..................... G09G 3/2965  
                                                    345/60  
(Continued)

FOREIGN PATENT DOCUMENTS

CN      1933309 A       3/2007  
CN    103747578 A       4/2014  
(Continued)

OTHER PUBLICATIONS

International Search Report in International application No. PCT/CN2021/114214, mailed on Apr. 27, 2022.  
(Continued)

*Primary Examiner* — Shaheda A Abdin  
(74) *Attorney, Agent, or Firm* — PV IP PC; Wei Te Chung

(57) ABSTRACT

The disclosure discloses a drive circuit included a first transistor electrically connected to a first control terminal, a first voltage terminal, and a first node; an inductor electrically connected to the first node and a second voltage terminal; a first diode electrically connected to a grounding terminal and the first node; a first capacitor electrically connected to a second voltage terminal and the grounding terminal; and a discharging circuit module electrically connected to the first node and the grounding terminal to provide a discharging circuit to discharge the capacitor.

16 Claims, 4 Drawing Sheets

(56) References Cited

U.S. PATENT DOCUMENTS

| | | | | |
|---|---|---|---|---|
| 2006/0044222 | A1* | 3/2006 | Yang | G09G 3/2965 |
| | | | | 345/60 |
| 2006/0262045 | A1* | 11/2006 | Park | G09G 3/2965 |
| | | | | 345/68 |
| 2010/0148741 | A1 | 6/2010 | Chen et al. | |
| 2015/0270703 | A1 | 9/2015 | Reiter et al. | |
| 2020/0169168 | A1* | 5/2020 | Balaz | H03K 19/01735 |
| 2020/0175914 | A1* | 6/2020 | Bae | G09G 3/3233 |

FOREIGN PATENT DOCUMENTS

| | | |
|---|---|---|
| CN | 203617907 U | 5/2014 |
| CN | 103840661 A | 6/2014 |
| CN | 204633602 U | 9/2015 |
| CN | 106098000 A | 11/2016 |
| CN | 107040134 A | 8/2017 |
| CN | 107959419 A | 4/2018 |
| CN | 108809086 A | 11/2018 |
| CN | 109659925 A | 4/2019 |
| JP | 2004007853 A | 1/2004 |

OTHER PUBLICATIONS

Written Opinion of the International Search Authority in International application No. PCT/CN2021/114214, mailed on Apr. 27, 2022.
Chinese Office Action issued in corresponding Chinese Patent Application No. 202110935822.9 dated Apr. 6, 2023, pp. 1-7.
Chinese Office Action issued in corresponding Chinese Patent Application No. 202110935822.9 dated Jun. 21, 2023, pp. 1-6.

* cited by examiner

DRIVE CIRCUIT AND DISPLAY DEVICE

FIELD OF INVENTION

The present invention relates to display technologies, and more particularly, to a drive circuit and a display device.

BACKGROUND OF INVENTION

A drive circuit of a known display device includes a power management integrated chip, which often involves an asynchronous step-down circuit to generate a voltage of 3.3V. However, the structure of the asynchronous step-down circuit works in an intermittent mode in a light-loading condition and may easily cause LC oscillation, leading to signal instability and thus affecting a displaying effect of the display device.

SUMMARY OF INVENTION

The disclosure provides a drive circuit and a display device, which help enhance signal stability.

In an aspect, the disclosure provides a drive circuit, which comprises:
 a first transistor, which comprises a gate electrically connected to a first control terminal, a drain of the first transistor being electrically connected to a first voltage terminal, a source of the first transistor being electrically connected to a first node;
 an inductor, which comprises a first end electrically connected to the first node, a second end of the inductor being electrically connected to a second voltage terminal;
 a first diode, which comprises a positive end electrically connected to a grounding terminal, a negative end of the first diode being electrically connected to the first node;
 a first capacitor, which comprises a first end electrically connected to the second voltage terminal, a second end of the first capacitor being electrically connected to the grounding terminal; and
 a discharging circuit module, the discharging circuit module being electrically connected to the first node and the grounding terminal, the discharging circuit module providing a discharging circuit for discharging the capacitor.

In the drive circuit of the disclosure, the discharging circuit module comprises a second transistor;
 wherein a gate of the second transistor is electrically connected to a second control terminal, a drain of the second transistor being electrically connected to the first node, a source of the second transistor being electrically connected to the grounding terminal.

In the drive circuit of the disclosure, the first transistor is one of an N-type transistor and a P-type transistor, and the second transistor is another one of the N-type transistor and the P-type transistor.

In the drive circuit of the disclosure, the first transistor and the second transistor are arranged in a power management integrated chip.

In the drive circuit of the disclosure, the drive circuit further comprises a charge pump output module;
 wherein the charge pump output module is electrically connected to the first node, the charge pump output module being operable to generate a predetermined voltage based on a voltage of the first node.

In the drive circuit of the disclosure, the charge pump output module comprises a second capacitor, a second diode, a third diode, and a third capacitor;
 wherein a first end of the second capacitor is electrically connected to the first node, a second end of the second capacitor being electrically connected to a positive end of the second diode and a negative end of the third diode, a negative end of the second diode being electrically connected to the grounding terminal, a positive end of the third diode being electrically connected to a first end of the third capacitor, a second end of the third capacitor being electrically connected to the grounding terminal.

In the drive circuit of the disclosure, the drive circuit comprises a first drive time interval, a second drive time interval, a third drive time interval, and a fourth drive time interval;
 wherein in the first drive time interval, an inductor current flows in a forward direction to charge the inductor;
 in the second drive time interval, the inductor current discharges in the forward direction to charge the first capacitor;
 in the third drive time interval, the discharging of the inductor current is ended and zeroed, and the first capacitor charges the inductor by means of the discharging circuit module; and
 in the fourth drive time interval, a voltage received at the first voltage terminal charges the inductor.

In the drive circuit of the disclosure, in the first drive time interval and the fourth drive time interval, the first transistor is conducted on; and in the second drive time interval and the third drive time interval, the first transistor is cut off.

In the drive circuit of the disclosure, in the first drive time interval and the fourth drive time interval, the discharger module is conducted on; and in the second drive time interval and the third drive time interval, the discharger module is cut off.

In a second aspect, the disclosure also provides a display device, which comprises a display panel and a drive circuit, the display panel being electrically connected to the drive circuit;
 wherein the drive circuit comprises:
 a first transistor, which comprises a gate electrically connected to a first control terminal, a drain of the first transistor being electrically connected to a first voltage terminal, a source of the first transistor being electrically connected to a first node;
 an inductor, which comprises a first end electrically connected to the first node, a second end of the inductor being electrically connected to a second voltage terminal;
 a first diode, which comprises a positive end electrically connected to a grounding terminal, a negative end of the first diode being electrically connected to the first node;
 a first capacitor, which comprises a first end electrically connected to the second voltage terminal, a second end of the first capacitor being electrically connected to the grounding terminal; and
 a discharging circuit module, the discharging circuit module being electrically connected to the first node and the grounding terminal, the discharging circuit module providing a discharging circuit for discharging the capacitor.

In the display device of the disclosure, the discharging circuit module comprises a second transistor;

wherein a gate of the second transistor is electrically connected to a second control terminal, a drain of the second transistor being electrically connected to the first node, a source of the second transistor being electrically connected to the grounding terminal.

In the display device of the disclosure, the first transistor is one of an N-type transistor and a P-type transistor, and the second transistor is another one of the N-type transistor and the P-type transistor.

In the display device of the disclosure, the first transistor and the second transistor are arranged in a power management integrated chip.

In the display device of the disclosure, the drive circuit further comprises a charge pump output module;
wherein the charge pump output module is electrically connected to the first node, the charge pump output module being operable to generate a predetermined voltage based on a voltage of the first node.

In the display device of the disclosure, the charge pump output module comprises a second capacitor, a second diode, a third diode, and a third capacitor;
wherein a first end of the second capacitor is electrically connected to the first node, a second end of the second capacitor being electrically connected to a positive end of the second diode and a negative end of the third diode, a negative end of the second diode being electrically connected to the grounding terminal, a positive end of the third diode being electrically connected to a first end of the third capacitor, a second end of the third capacitor being electrically connected to the grounding terminal.

In the display device of the disclosure, the drive circuit comprises a first drive time interval, a second drive time interval, a third drive time interval, and a fourth drive time interval;
wherein in the first drive time interval, an inductor current flows in a forward direction to charge the inductor;
in the second drive time interval, the inductor current discharges in the forward direction to charge the first capacitor;
in the third drive time interval, the discharging of the inductor current is ended and zeroed, and the first capacitor charges the inductor by means of the discharging circuit module; and
in the fourth drive time interval, a voltage received at the first voltage terminal charges the inductor.

In the display device of the disclosure, in the first drive time interval and the fourth drive time interval, the first transistor is conducted on; and in the second drive time interval and the third drive time interval, the first transistor is cut off.

In the display device of the disclosure, in the first drive time interval and the fourth drive time interval, the discharger module is conducted on; and in the second drive time interval and the third drive time interval, the discharger module is cut off.

The beneficial effect of the present disclosure is that: the disclosure provides a drive circuit and a display device, in which a discharging circuit is provided by a discharging circuit module to enable discharging of a capacitor, so that a reversed discharging path is formed for the drive circuit in a light-loading mode to maintain a fixed operation frequency and amplitude, thereby enhancing the signal stability.

DESCRIPTION OF DRAWINGS

To more clearly expound the technical solutions of embodiments of the disclosure, the following provides a brief description of drawings that are necessary for the description of the embodiments. Obviously, the drawings as described below disclose only some of the embodiments of the disclosure, and for skilled artisans of the field, other drawings may be contemplated according to the attached drawings without creative endeavor.

DETAILED DESCRIPTION OF PREFERRED EMBODIMENTS

A clear and complete description of a technical solution of an embodiment of the disclosure will be provided below with reference to the drawings of the embodiment of the disclosure. However, the described embodiment covers only some of the embodiments, but not all of the embodiments, of the disclosure. Embodiments that can be contemplated by skilled artisans of the technical field without paying creative endeavor are considered belonging to the scope of protection that the disclosure seeks for. It is understood that the embodiments described herein are provided only for illustrating and explaining the disclosure and are not intended to limit the disclosure. Terms, such as "first" and "second", used in the claims and the specification of the disclosure, are used to distinguish different subjects and are not used to describe a specific sequence.

Embodiments of the disclosure provide a drive circuit and a display device, which allow for improvement of signal stability, so as to enhance a displaying effect of the display device. A detailed description will be provided below. It is noted that the sequence of description for the embodiments made below is not intended to limit the preference of the embodiments. Transistors that are used in all the embodiments of the disclosure can be thin-film transistors or field effect transistor, or other devices having similar properties.

Further, the transistors used in the embodiments of the disclosure may include P-type transistors and/or N-type transistors, in which the P-type transistors enable conduction between the source and the drain when the gate is at a low level; and conduction between the source and the drain is cut off when the gate is at a high level. The N-type transistors enable conduction between the source and the drain when the gate is at a high level; and conduction between the source and the drain is cut off when the gate is at a low level.

Figure 1:
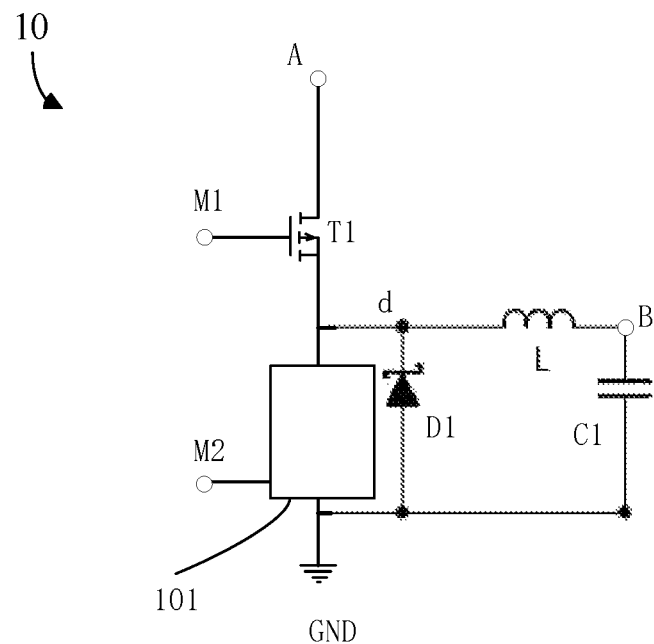
FIG. 1 is a schematic view showing a first structure of a drive circuit provided in an embodiment of the disclosure.

Referring to FIG. 1, FIG. 1 is a schematic view showing a first structure of a drive circuit provided in an embodiment of the disclosure. As shown in FIG. 1, the drive circuit 10 provided in the embodiment of the disclosure comprises a first transistor T1, an inductor L, a first diode D1, a first capacitor C1, and a discharger module 101. A gate of the first transistor T1 is electrically connected to a first control terminal M1; a drain of the first transistor T1 is electrically connected to a first voltage terminal A; a source of the first transistor T1 is electrically connected to a first node d. A first end of the inductor L is electrically connected to the first node d, and a second end of the inductor L is electrically connected to a second voltage terminal B. A positive end of the first diode D1 is electrically connected to a grounding terminal GND, and a negative end of the first diode D1 is electrically connected to the first node d. A first end of the first capacitor C1 is electrically connected to the second voltage terminal B, and a second end of the first capacitor C1 is electrically connected to the grounding terminal GND. The discharging circuit module 101 is electrically connected to the first node d and the grounding terminal GND. The discharging circuit module 101 functions to serve as a discharging circuit for discharging the first capacitor C1.

In the circuit, the first voltage terminal A serves as a voltage input terminal, and the second voltage terminal B serves as a voltage output terminal. In the display panel industry, for a known power management integrated chip, a drive circuit often adopts asynchronous rectification architecture. The drive circuit 10 provided in the embodiment of the disclosure adopts an asynchronous rectification architecture, making an input voltage of the first voltage terminal A smaller than an output voltage of the second voltage terminal B. The input voltage received in the first voltage terminal A transmits through the first transistor T1, the inductor L, and the first diode D1 to complete a voltage step-down operation so as to generate the output voltage at the second voltage terminal B.

Figure 2:
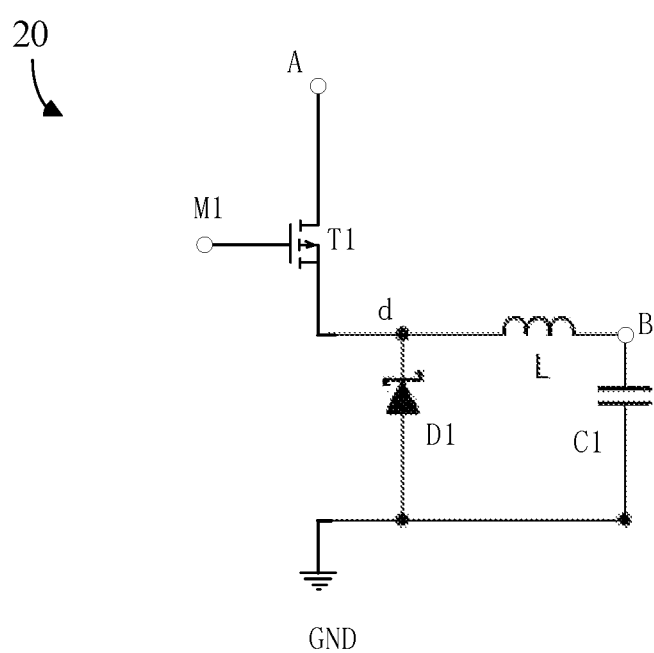
FIG. 2 is a schematic view showing a second structure of a drive circuit provided in an embodiment of the disclosure.
Figure 3:
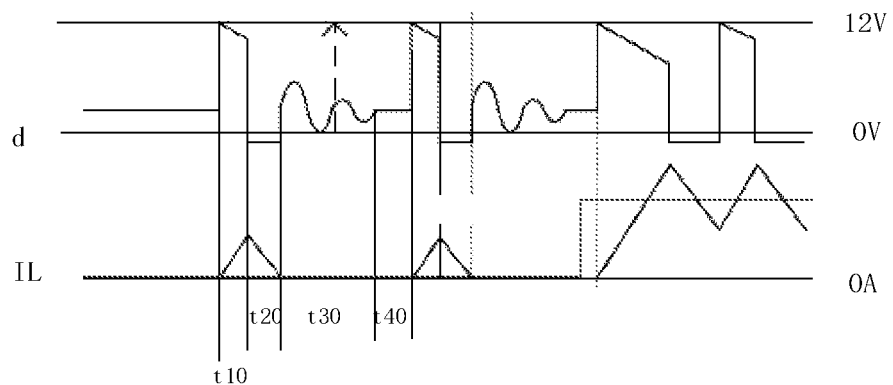
FIG. 3 is a schematic view showing a signal waveform of the drive circuit shown in FIG. 2 in a light-loading condition.

It is noted that if the drive circuit 10 does not include the discharging circuit module 101, a signal at the first node d would become unstable. Referring to FIGS. 2 and 3, FIG. 2 is a schematic view showing a second structure of a drive circuit provided in an embodiment of the disclosure. FIG. 3 is a schematic view showing a signal waveform of the drive circuit shown in FIG. 2 in a light-loading condition. Specifically, with reference to both FIGS. 2 and 3, the drive circuit 20 includes a first time interval t10, a second time interval t20, a third time interval t30, and a fourth time interval t40.

In the circuit, in the first time interval t10, the first transistor T1 is conducted on and the first voltage terminal A charges toward the inductor L, setting an inductor current IL in a forward direction; at the moment, the inductor current IL flows from the first transistor T1 to the inductor. In the second time interval t20, the first transistor T1 is cut off and the inductor current IL discharges in the forward direction to charge the first capacitor C1. In the third time interval t30, the first transistor T1 is cut off and discharging by the inductor current IL is ended and zeroed. Since there is no discharging circuit module 101 provided, the first capacitor C1 has no path to discharge and parasitic components on the lines start to charge and discharge, parasitic inductors discharging to parasitic capacitors and parasitic capacitor discharging to parasitic inductors, so that a signal at the first node d generates an LC oscillation, leading to one or more rounds of conducting of the first transistor T1 that are supposed to occur during the period become skipped due to excessive residual energy and thus causing signal instability and insufficiency of driving power. In the fourth time interval t40, the first transistor T1 is cut off and the energy of the parasitic components zero, so that there is no electric current flowing in the inductor L, and at the moment, the potential of the first node d corresponds to the potential of the second voltage terminal B.

Figure 4:
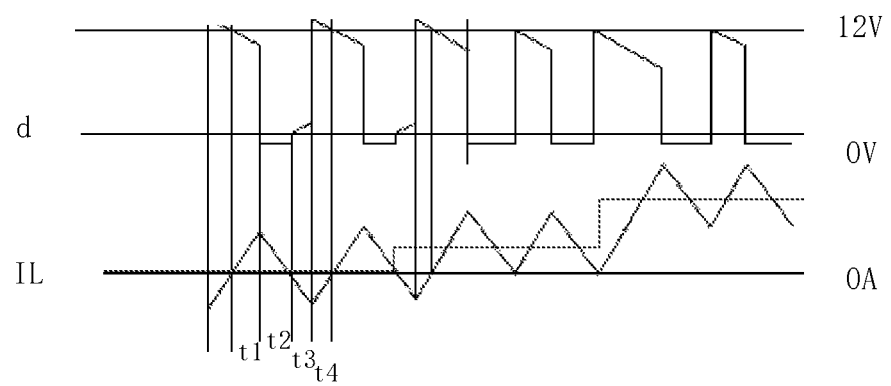
FIG. 4 is a schematic view showing a signal waveform of the drive circuit shown in FIG. 1 in a light-loading condition.

Further, referring to FIG. 4, FIG. 4 is a schematic view showing a signal waveform of the drive circuit shown in FIG. 1 in a light-loading condition. Specifically, reference being also had to FIG. 1, as shown in FIG. 4, the drive circuit 10 includes a first drive time interval t1, a second drive time interval t2, a third drive time interval t3, and a fourth drive time interval t4.

In the circuit, in the first drive time interval t1, the first transistor T1 is conducted on and the first voltage terminal A discharges toward the inductor L, setting an inductor current IL in a forward direction; at the moment, the inductor current IL flows from the first transistor T1 to the inductor L. In the second drive time interval t2, the first transistor T1 is cut off and the inductor current IL discharges in the forward direction to charge the first capacitor C1. In the third drive time interval t3, the first transistor T1 is cut off and charging by the inductor current IL is ended and zeroed. Due to the presence of the discharging circuit module 101, the first capacitor C1 is now allowed to charge the inductor L by way of the discharging circuit module 101 and thus, the first capacitor C1 is discharged. In the fourth drive time interval t4, the first transistor T1 is conducted on and the voltage received in the first voltage terminal A charges the inductor L.

The drive circuit 10 provided in the embodiment of the disclosure provides a discharging circuit, by means of the discharging circuit module 101, to enable discharging of the first capacitor C1, so that a reversed discharging path is formed for the drive circuit 10 in a light-loading mode to maintain a fixed operation frequency and amplitude, thereby enhancing the signal stability.

Figure 5:
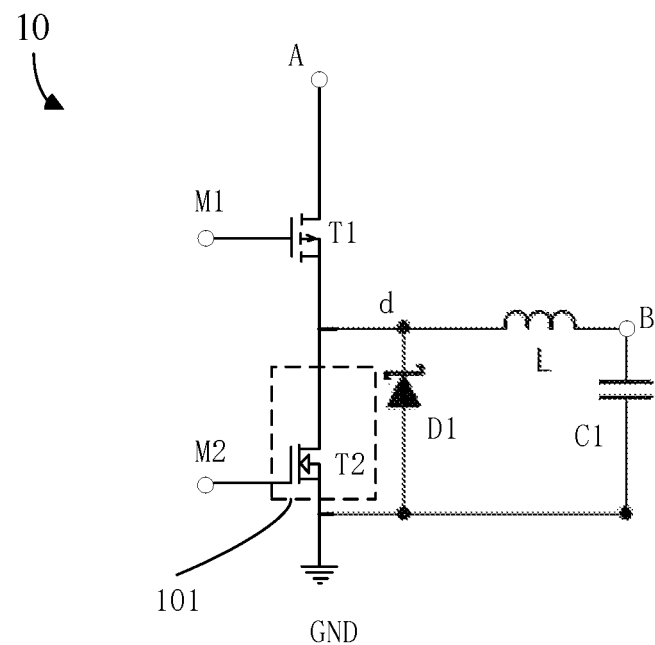
FIG. 5 is a circuit diagram of a drive circuit provided in an embodiment of the disclosure.

Referring to FIG. 5, FIG. 5 is a circuit diagram of a drive circuit provided in an embodiment of the disclosure. Reference being also had to FIG. 1, as shown in FIG. 5, the discharger module 101 comprises a second transistor T2. A gate of the second transistor T2 is electrically connected to a second control terminal M2; a drain of the second transistor T2 is electrically connected to the first node d; and a source of the second transistor T2 is electrically connected to the grounding terminal GND.

In the circuit, the first transistor T1 and the second transistor T2 are driven in a complementary manner with the same frequency to ensure that when the first transistor T1 is conducted on, the second transistor T2 is cut off; and when the first transistor T1 is cut off, the second transistor T2 is conducted on. In some embodiments, the first transistor T1 is one of an N-type transistor and a P-type transistor, while the second transistor T2 is another one of the N-type transistor and the P-type transistor.

In the circuit, the first transistor T1 and the second transistor T2 are both arranged inside a power management integrated chip. In some embodiments, the inductor L, the first diode D1, and the first capacitor C1 are arranged outside the power management integrated chip. Of course, in some other embodiments, the inductor L, the first diode D1, and the first capacitor C1 may be included in the power management integrated chip.

Specifically, reference being had to both FIGS. 4 and 5, in the first drive time interval t1, the first transistor T1 is conducted on and the second transistor T2 is cut off, and the first voltage terminal A charges the inductor L, setting an inductor current IL in a forward direction; at the moment, the inductor current IL flows from the first transistor T1 to the inductor L. In the second drive time interval t2, the first transistor T1 is cut off and the second transistor T2 is conducted on, and the inductor current IL discharges in the forward direction to charge the first capacitor C1. In the third drive time interval t3, the first transistor T1 is cut off and the second transistor T2 is conducted on, charging by the inductor current IL is ended and zeroed. Due to the presence of the discharging circuit module 101, the first capacitor C1 is allowed to charge the inductor L by way of the discharging circuit module 101, and thus, the first capacitor C1 is discharged. In the fourth drive time interval t4, the first transistor T1 is conducted on and the second transistor T2 is cut off, and the voltage received in the first voltage terminal A charges the inductor L.

The drive circuit 10 provided in the embodiment of the disclosure provides a discharging circuit, by means of the second transistor T2, to enable discharging of the first capacitor C1, so that a reversed discharging path is formed for the drive circuit 10 in a light-loading mode to maintain a fixed operation frequency and amplitude, thereby enhancing the signal stability.

Figure 6:
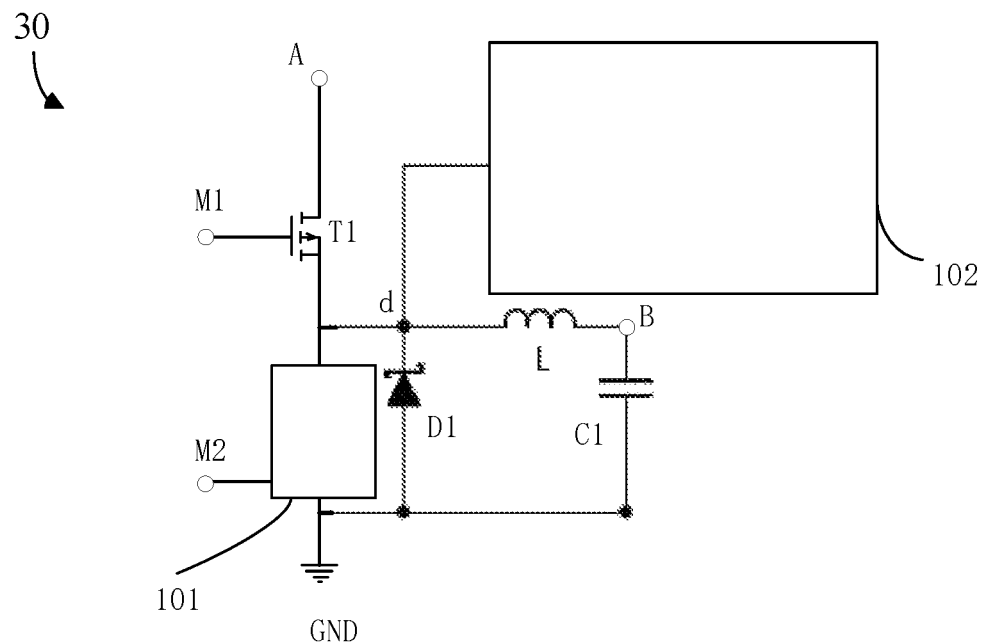
FIG. 6 is a schematic view showing a third structure provided in an embodiment of the disclosure.

Referring to FIG. 6, FIG. 6 is a schematic view showing a third structure provided in an embodiment of the disclosure. The drive circuit 30 illustrated in FIG. 6 is different from the drive circuit 10 of FIG. 1 in that the drive circuit 30 illustrated in FIG. 6 further comprises a charge pump output module 102. The charge pump output module 102 is electrically connected to the first node d, and the charge pump output module 102 is operable to generate a predetermined voltage based on the voltage of the first node d.

It is understood that the embodiment of the disclosure utilizes the signal of the first node d of the drive circuit 10 shown in FIG. 1 to serve as a drive voltage of the charge pump output module 102 for the generation of the predetermined voltage. Further, since the signal of the first node d is kept stable, using the signal of the first node d at the moment to serve as the drive voltage of the charge pump output module 102 does not result in insufficiency of output voltage and does not affect the effect of displaying, and thus, the stability of the predetermined voltage output from the charge pump output module 102 is ensured.

The drive circuit 30 provided in the embodiment of the disclosure provides a discharging circuit, by means of the discharging circuit module 101, to enable discharging of the first capacitor C1, so that a reversed discharging path is formed for the drive circuit 30 in a light-loading mode to maintain a fixed operation frequency and amplitude, thereby enhancing the signal stability; further, the drive circuit 30 provided in the embodiment of the disclosure is also operable to utilize the signal of the first node d as the drive voltage of the charge pump output module 102 for generation of the predetermined voltage. Since the signal of the first node d is stable, using the signal of the first node d of the moment to serve as the drive voltage of the charge pump output module 102 does not result in insufficiency of output voltage and does not affect the effect of displaying, and thus, the stability of the predetermined voltage output from the charge pump output module 102 is ensured.

Figure 7:
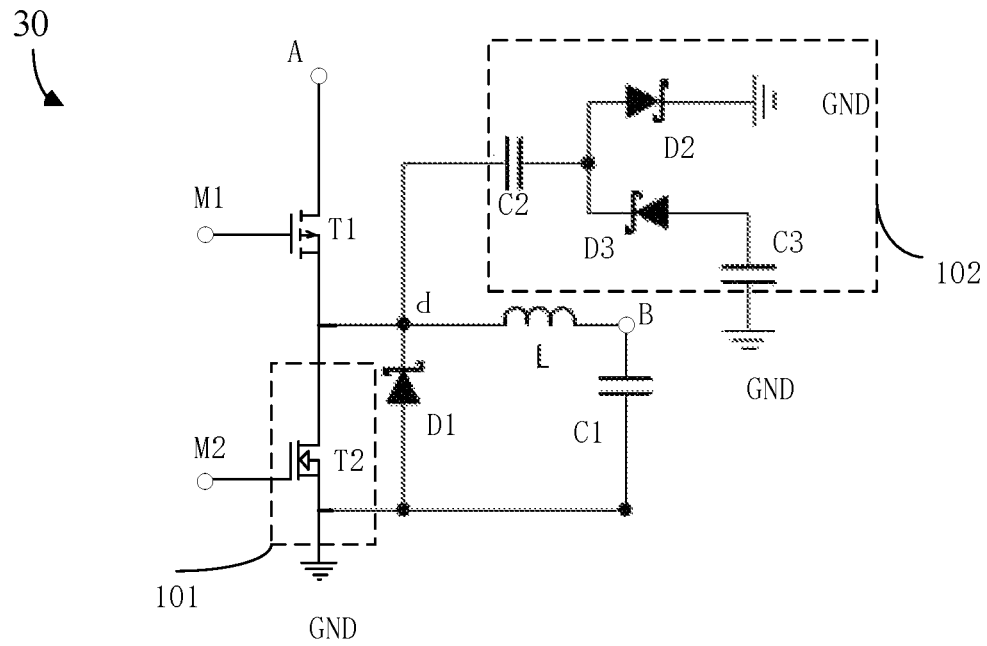
FIG. 7 is another circuit diagram of a drive circuit provided in an embodiment of the disclosure.

Referring to FIG. 7, FIG. 7 is another circuit diagram of a drive circuit provided in an embodiment of the disclosure. Reference being also had to FIG. 6, as shown in FIG. 7, the charge pump output module 102 comprises a second capacitor C2, a second diode D2, a third diode D3, and a third capacitor C3. A first end of the second capacitor C2 is electrically connected to the first node d. A second end of the second capacitor C2 is electrically connected to a positive end of the second diode D2 and a negative end of the third diode D3. A negative end of the second diode D2 is electrically connected to the grounding terminal GND. A positive end of the third diode D3 is electrically connected to a first end of the third capacitor C3. A second end of the third capacitor C3 is electrically connected to the grounding terminal GND.

It is noted that, the embodiment of the disclosure utilizes a switching signal of the voltage step-down circuit, which is the signal at the first node d, to serve as an input voltage of the charge pump output module and further utilizes the properties that the voltage across the two ends of the second capacitor C2 does not vary abruptly and and the second diode D2 and the third diode D3 are each conducting in a one-way manner, to obtain the output voltage of the charge pump output module 102.

The drive circuit 30 provided in the embodiment of the disclosure provides a discharging circuit, by means of the second transistor T2, to enable discharging of the first capacitor C1, so that a reversed discharging path is formed for the drive circuit 30 in a light-loading mode to maintain a fixed operation frequency and amplitude, thereby enhancing the signal stability; further, the drive circuit provided in the embodiment of the disclosure is also operable to utilize the signal of the first node d as the drive voltage of the charge pump output module 102 for generation of the predetermined voltage. Since the signal of the first node d is stable, using the signal of the first node d of the moment to serve as the drive voltage of the charge pump output module 102 does not result in insufficiency of output voltage and does not affect the effect of displaying, and thus, the stability of the predetermined voltage output from the charge pump output module 102 is ensured.

Figure 8:
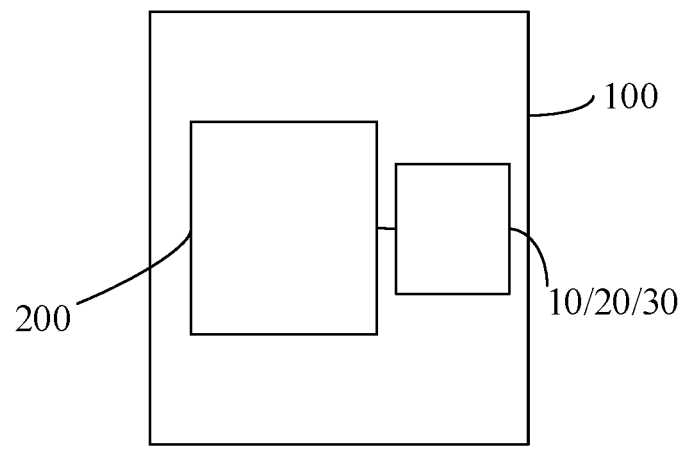
FIG. 8 is a schematic view showing a structure of a display device provided in an embodiment of the present invention.

Referring to FIG. 8, FIG. 8 is a schematic view showing a structure of a display device provided in an embodiment of the present invention. As shown in FIG. 8, a display device 100 provided in the embodiment of the disclosure comprises a display panel 200 and a drive circuit 10/20/30. The display panel 200 is electrically connected to the drive circuit 10/20/30. The drive circuit 10/20/30 is the drive circuit depicted in the above embodiments and specifics can be referred to the above embodiments.

The display device provided in the embodiment of the disclosure provides a discharging circuit, by means of the discharging circuit module, to enable discharging of the capacitor, so that a reversed discharging path is formed for the drive circuit in a light-loading mode to maintain a fixed operation frequency and amplitude, thereby enhancing the signal stability.

A detailed description is provided above for a current-limiting circuit of the embodiments of the disclosure. Example embodiments are included in the disclosure for the purposes of expounding the principles and ways of embodiment for the disclosure. The description of the embodiments provided above is just for helping understanding of the methodology and core ideas of the disclosure. Further, for skilled artisans in the field, variations based on the ideas of the disclosure may be implemented in respect of the ways of embodiment and the scope of applications. In summary, the contents of the disclosure should not be construed as limiting to the disclosure.

What is claimed is:
1. A drive circuit, comprising:
   a first transistor comprising a gate electrically connected to a first control terminal, a drain electrically connected to a first voltage terminal, and a source electrically connected to a first node;
   an inductor comprising a first end electrically connected to the first node, and a second end electrically connected to a second voltage terminal;

a first diode comprising an anode electrically connected to a grounding terminal and a cathode electrically connected to the first node;

a first capacitor comprising a first end electrically connected to the second voltage terminal and a second end electrically connected to the grounding terminal; and a discharging circuit module electrically connected to the first node and the grounding terminal and configured to discharge the first capacitor, wherein the drive circuit is configured to operate in a first drive phase, a second drive phase, a third drive phase, and a fourth drive phase, in the first drive phase, current flows in the inductor in a forward direction, and the inductor is charged, in the second drive phase, current flows in the inductor in the forward direction, the inductor is discharged, and the first capacitor is charged, in the third drive phase, the inductor is not discharged, no current flows in the inductor, and the inductor is charged by the first capacitor by means of the discharging circuit module, and in the fourth drive phase, the inductor is charged by input voltage to the first voltage terminal.

2. The drive circuit according to claim 1, wherein the discharging circuit module comprises a second transistor; and wherein the second transistor comprises a gate electrically connected to a second control terminal, a drain electrically connected to the first node, and a source electrically connected to the grounding terminal.

3. The drive circuit according to claim 2, wherein the first transistor is one selected from an N-type transistor and a P-type transistor, and the second transistor is another one selected from the N-type transistor and the P-type transistor.

4. The drive circuit according to claim 2, wherein the first transistor and the second transistor are arranged in a power management integrated chip.

5. The drive circuit according to claim 1, wherein the drive circuit further comprises a charge pump output module; and wherein the charge pump output module is electrically connected to the first node, and is configured to generate a predetermined voltage based on a voltage of the first node.

6. The drive circuit according to claim 5, wherein the charge pump output module further comprises a second capacitor, a second diode, a third diode, and a third capacitor; and wherein a first end of the second capacitor is electrically connected to the first node, a second end of the second capacitor is electrically connected to an anode of the second diode and a cathode of the third diode, a cathode of the second diode is electrically connected to the grounding terminal, an anode of the third diode is electrically connected to a first end of the third capacitor, and a second end of the third capacitor is electrically connected to the grounding terminal.

7. The drive circuit according to claim 1, wherein in the first drive phase and the fourth drive time interval phase, the first transistor is turned on, and in the second drive phase and the third drive phase, the first transistor is turned off.

8. The drive circuit according to claim 1, wherein in the first drive phase and the fourth drive phase, the discharging circuit module is turned on, and in the second drive phase and the third drive time interval phase, the discharging circuit module is turned off.

9. A display device, comprising a display panel and a drive circuit, wherein the display panel is electrically connected to the drive circuit; and wherein the drive circuit comprises:

a first transistor comprising a gate electrically connected to a first control terminal, a drain electrically connected to a first voltage terminal, and a source electrically connected to a first node;

an inductor comprising a first end electrically connected to the first node and a second end electrically connected to a second voltage terminal;

a first diode comprising an anode electrically connected to a grounding terminal and a cathode electrically connected to the first node;

a first capacitor comprising a first end electrically connected to the second voltage terminal and a second end electrically connected to the grounding terminal; and a discharging circuit module electrically connected to the first node and the grounding terminal and configured to discharge the first capacitor, wherein the drive circuit is configured to operate in a first drive phase, a second drive phase, a third drive phase, and a fourth drive phase, in the first drive phase, current flows in the inductor in a forward direction, and the inductor is charged, in the second drive phase, current flows in the inductor in the forward direction, the inductor is discharged, and the first capacitor is charged, in the third drive phase, the inductor is not discharged, no current flows in the inductor, and the inductor is charged by the first capacitor by means of the discharging circuit module, and in the fourth drive phase, the inductor is charged by input voltage to the first voltage terminal.

10. The display device according to claim 9, wherein the discharging circuit module comprises a second transistor; and wherein the second transistor comprises a gate electrically connected to a second control terminal, a drain electrically connected to the first node, and a source of the second transistor is electrically connected to the grounding terminal.

11. The display device according to claim 10, wherein the first transistor is one selected from an N-type transistor and a P-type transistor, and the second transistor is another one selected from the N-type transistor and the P-type transistor.

12. The display device according to claim 10, wherein the first transistor and the second transistor are arranged in a power management integrated chip.

13. The display device according to claim 9, wherein the drive circuit further comprises a charge pump output module; and wherein the charge pump output module is electrically connected to the first node, and is configured to generate a predetermined voltage based on a voltage of the first node.

14. The display device according to claim 13, wherein the charge pump output module further comprises a second capacitor, a second diode, a third diode, and a third capacitor; and wherein a first end of the second capacitor is electrically connected to the first node, a second end of the second capacitor is electrically connected to an anode of the second diode and a cathode of the third diode, a cathode of the second diode is electrically connected to the grounding terminal, an anode of the third diode is electrically connected to a first end of the third capacitor, and a second end of the third capacitor is electrically connected to the grounding terminal.

15. The display device according to claim 9, wherein in the first drive phase and the fourth drive phase, the first transistor is turned on, and in the second drive phase and the third drive phase, the first transistor is turned off.

16. The display device according to claim 9, wherein in the first drive phase and the fourth drive phase, the discharging circuit module is turned on, and in the second drive phase and the third drive phase, the discharging circuit module is turned off.

* * * * *